Aug. 30, 1932.  C. R. LAW ET AL  1,875,035

VALVE

Original Filed Nov. 15, 1927  4 Sheets-Sheet 4

Inventors
Charles R. Law
Charles T. Law
William Law
By Hardway Cartney
Attorneys Patented Aug. 30, 1932

1,875,035

UNITED STATES PATENT OFFICE

CHARLES R. LAW, WILLIAM LAW, AND CHARLES T. LAW, OF MANSFIELD, LOUISIANA, ASSIGNORS TO THE LAW COMPANY, INCORPORATED, OF MANSFIELD, LOUISIANA, A CORPORATION OF LOUISIANA

VALVE

Application filed November 15, 1927, Serial No. 233,500. Renewed November 13, 1931.

This invention relates to new and useful improvements in a valve.

One object of the invention is to provide a valve of the character described specially adapted to be incorporated into a pipe line, or other conduit, and which may be actuated into two positions and which, when in one position will close said line or conduit to prevent the flow of fluid therethrough and when in the other position will not only open the conduit but will provide a substantially uniform, smooth conduit through the valve casing, forming a continuation of the line or conduit, without obstructions, or pockets, to collect foreign matter, or objects, in the fluid which, if collected, might injure the mechanism or prevent the proper seating of the movable parts thereof.

Another object of the invention is to provide a simple valve structure, which may be cheaply produced, which is precise and positive in its action and whose parts when seated in either open or closed position will effectively prevent the leakage of the fluid past them.

With the above and other objects in view this invention has particular relation to certain novel features of construction, operation and arrangement of parts an example of which is given in this specification and illustrated in the accompanying drawings wherein:—

Figure 1:
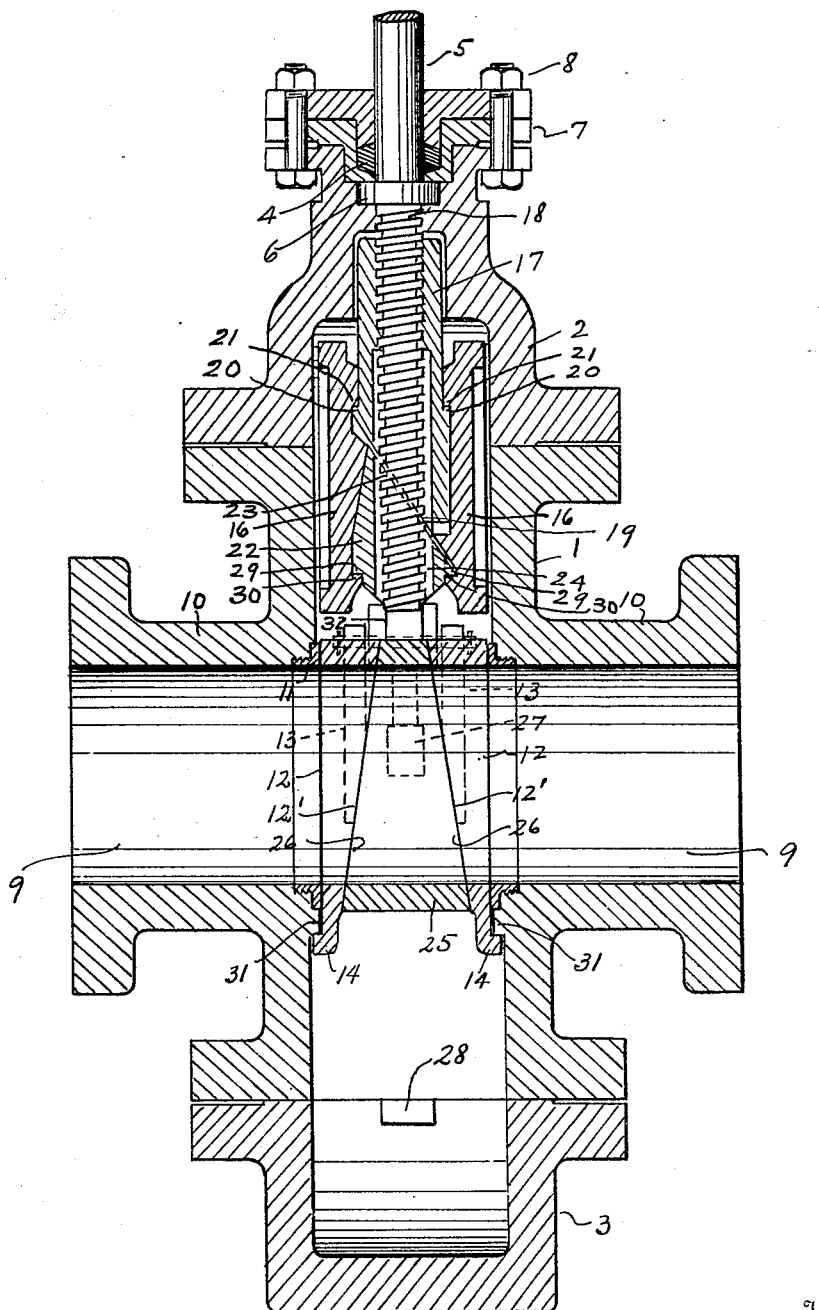
Figure 1 shows a vertical sectional view of the mechanism taken longitudinally of the conduit into which the valve is incorporated, showing the valve in open position.

Referring now more particularly to the drawings, wherein like numerals of reference designate similar parts in each of the figures the numeral 1 designates, as a whole, a casing, which includes the end caps, or plates 2 and 3, preferably detachable therefrom. The end plate 2 is equipped with a suitable stuffing box designated generally by the numeral 4. An actuating rod 5 works through this stuffing box and has an annular rib 6 thereon located between the end plate 2 and the gland 7, forming part of said stuffing box, said rib permitting said rod 5 to turn but preventing its end wise movement.

The stuffing box, generally stated, may be of any conventional construction and is held in assembled relation with the end plate 2 by suitable bolts, as 8. The rod 5 may be manipulated, or turned, by means of the conventional hand wheel (not shown) or by any other appliance suitable for the purpose. The casing 1 has oppositely disposed openings 9, 9 surrounded by the flanged connections 10, 10, to which the adjacent sections of a pipe line, or flow line may be connected, the connections 10 forming continuations of the conduit through said line and these connections have oppositely disposed valve seats 11, 11, within the casing, and which are preferably detachable.

Within the casing are the oppositely disposed annular sleeves 12, 12 whose inside diameters are substantially equal to the inside diameter of the connections 10 and the facing sides of these sleeves are sloping, or diverge toward the plate 3. Each sleeve 12 has the laterally extending wings 13, 13 and the depending outwardly turned shoulder 14.

Oppositely working valves 16, 16, are provided which are movable into active position to seat against the seats 11, 11 to close the flow line or conduit and are also movable into inactive position to open said conduit, as will be more particularly hereinafter set out. Between the valves 16 there is an actuating nut 17 and the inner end of the rod 5 extends through said nut and has the threads 18 which have a threaded connection with said nut. The inner end of said nut has a sloping, or beveled face 19 and the nut is formed with shoulders 20, 20 which are opposite and adapted to engage corresponding inwardly extending shoulders 21, 21 carried by the inner faces of the valves 16.

There is a wedge member 22, between the valves 16, which has a sloping face 23 reversely beveled with respect to, and adapted to co-operate with, the sloping face 19 into which the inner end of the nut 17 is formed. The end of the wedge member 22, adjacent the nut 17 has a deep socket 24 into which the inner end of the actuating rod 5 may work and the other end of the member 22 is formed with a ring 25 whose opposite sides are outwardly tapered, or flared, forming substantially annular faces 26, 26, adapted to work against the opposing sloping faces 12', 12' of the sleeves 12, and to form tight joints therewith, and this ring is formed with oppositely disposed bosses 27, 27 whose outer faces are adapted to ride against the corresponding sides of the casing 1 thereby forming guides, or runners, and these bosses also form abutments, adapted to abut the inside, oppositely disposed lugs 28, 28, carried by the inner walls of the casing, when the valves are in active, or closed, position.

The inside diameter of the ring 25 is substantially equal to the inside diameter of the sleeves 12 and the connections 10.

The wedge member 22 is formed with external shoulders 29, forming abutments with which the inside shoulders 30, of the valves 16 are adapted to engage, thus forming operative connections between said wedge member 22 and said valves.

The casing 1 has the oppositely disposed inwardly extending shoulders 31, 31 forming stops adapted to engage the opposing shoulders 14, of the sleeves 12, to stop said sleeves in exact alignment with the connections 10, when the valves 16 are moved into inactive, or open position.

Between the upper ends of the wings 13, 13 of each sleeve 12, there is a pivotally mounted carrier formed with the right angular wings 32, 33. When the valves are in closed position the wings 33 lie against the opposing walls of the casing 1 with the wings 32 extending inwardly and in engagement with the opposing external shoulders 34, carried on opposite sides of the ring 25.

Figure 2:
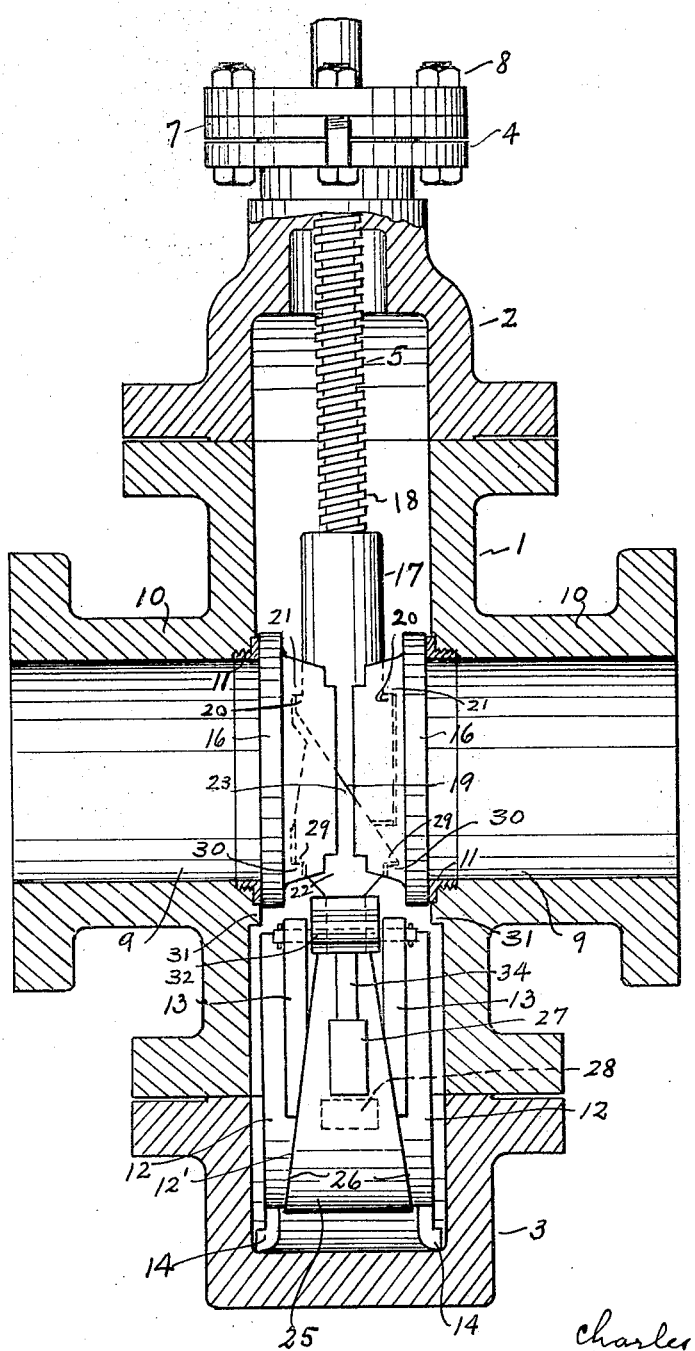
Figure 2 shows a similar view with the valve in position to close said line or conduit.
Figure 3:
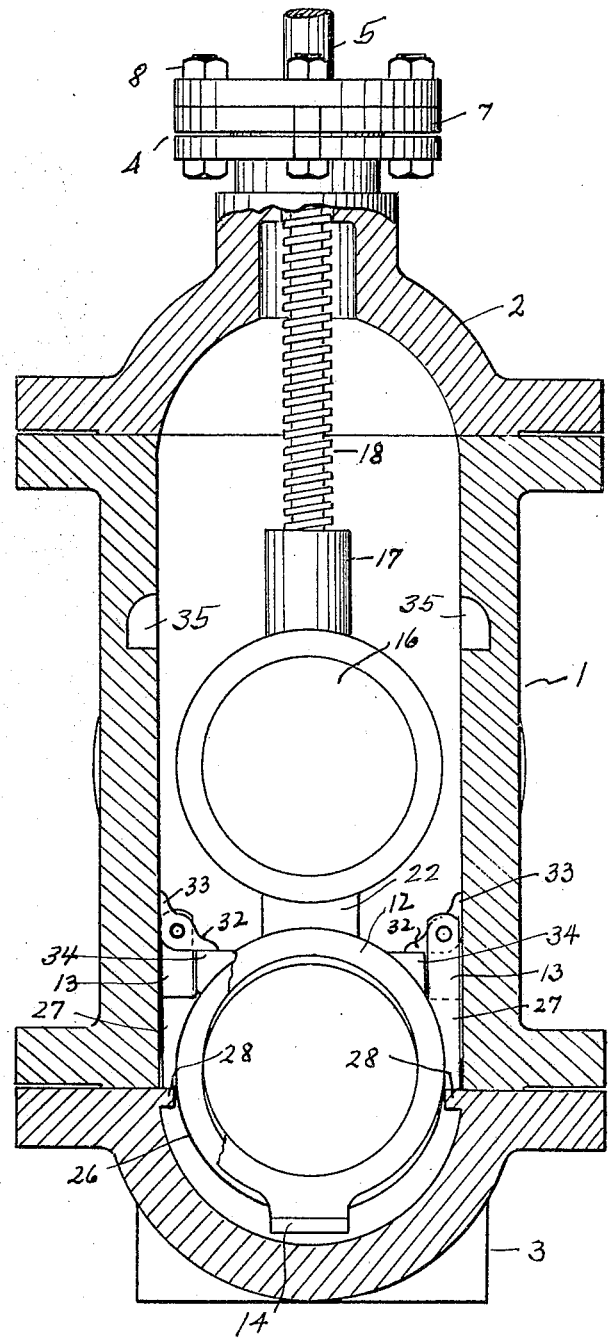
Figure 3 shows a transverse vertical sectional view, showing the conduit closed by the valve.
Figure 4:
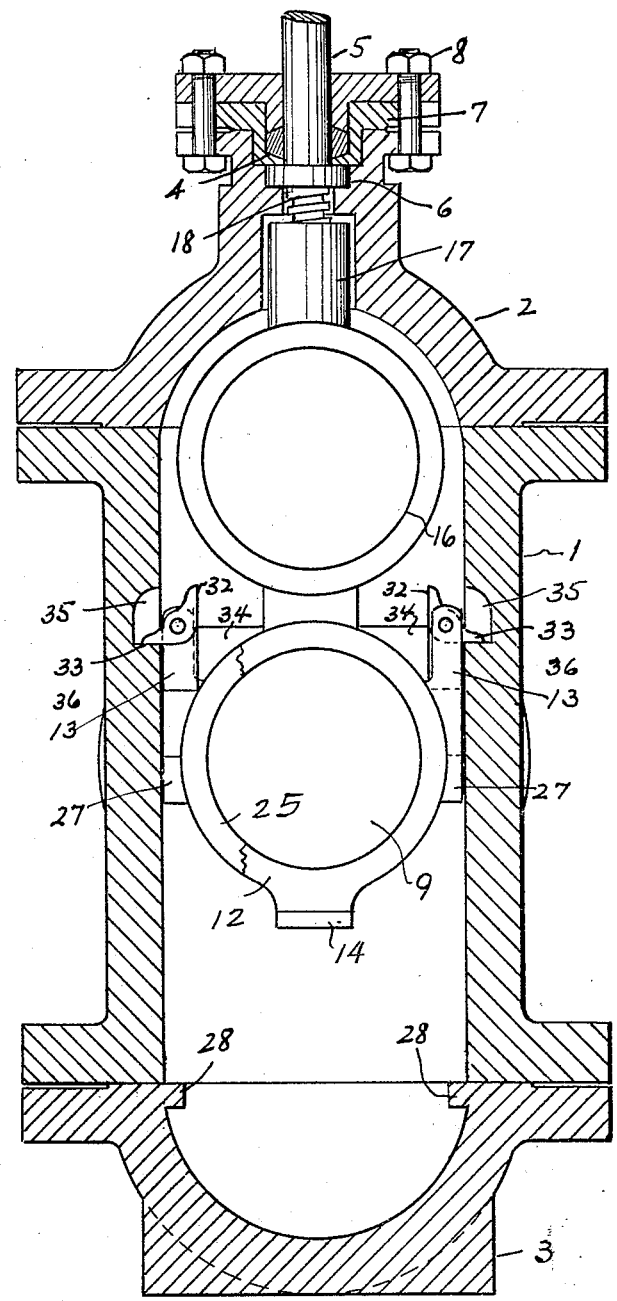
Figure 4 shows a transverse vertical sectional view, showing the conduit open through the valve casing.

The operation of the mechanism will now be described:—assuming that the valves 16, 16 are seated against the respective seats 11, 11 and the conduit to be controlled closed, as shown in Figures 2 and 3; if it be now desired to open the flow line and to move the valves into inactive position the rod 5 may be suitably turned to exert a pull through the nut 17 and this will immediately release the sloping face 19 from the sloping face 23 which will in turn release the outward pressure of the corresponding wedge members against the inner sides of said valves thus releasing the valves from their seats and leaving them free to move.

As the nut 17 is moved on, through the threaded connection with the rod 5, it will carry the valves 16 along with it, being interlocked with said valves through the shoulders 20, 21, and the valves will be thereby moved out of alignment with the flow line or into inactive position; and as said valves move they will carry the wedge member 22 along with them, being interlocked therewith through the shoulders 29, 30. The ring 25 being attached to the member 22 will move along with it and the opposing shoulders 34, thereof, will engage with the inwardly extending wings 32, of the carrier, and operate to move the sleeves 12 in concert with the movement of the other parts until said sleeves are carried into exact alignment with the seats 11, at which point the shoulders 14 engage the stops 31 and stop the sleeves in such alignment.

Meanwhile the upstanding wings 33 have moved opposite the opposing arcuate recesses 35, 35 provided in the inside wall of the casing 1 and the pressure of the shoulders 34 against the wings 32 operate to reverse the carriers, the wings 32 assuming an upright position, to permit the shoulders 34 to pass between them, and the wings 33 moving outwardly into said recesses 35 and against the end shoulders 36, thereof. A continued rotation of the rod 5 will now operate to draw the ring 25 into exact alignment with the sleeves 12 with the sloping faces 26 seated firmly against the opposing faces 12' thus operating to spread the sleeves 12 and to firmly seat them against the seats 11. The sleeves 12 and ring 25, when thus assembled will form a complete fluid tight conduit or flow way through the casing. This conduit or flow way will be of substantially uniform diameter without any internal projections to engage or retain foreign matter in the fluid passing through the line and will further seat against and protect the seats 11 against contact with, or injury by solid objects, sand or grit, carried by the fluid flowing through said line. When it is desired to close the flow line the rotation of the rod 5 will be reversed, which will cause a reverse movement of the nut 17. Upon a reverse movement of the nut 17 the inner end thereof will abut the opposing end of the member 22 and the ring 25 will be thereby released from the sleeves 12 permitting them to slightly contract and release themselves from the seats 11 and the wings 32 will be released by the shoulders 34 permitting the carrier to reverse and the entire mechanism will be moved backwardly along the casing, and the continued rotation of the rod 5 will operate to carry the valves 16, the ring 25 and the sleeves 12 backwardly until the bosses 27 engage the lugs 28 thus stopping the backward movement of the wedge member 22. In this position the valves 16 will be aligned with the seats 11 and the further rotation of the rod 5 will force the sloping faces 19 and 22 into cooperating relation and this will act with wedge like effect to force said valves apart and seat them securely against the corresponding seats 11 and thus securely close the conduit or flow line.

It will thus be observed that as the valves are moved into inactive or open position a supplemental conduit is provided to take its place between the valve seats 11 and form a continuous unobstructed passageway through the valve casing without internal projections and with all parts of the mechanism protected against injury from objects in the fluid flowing through said line and without internal cavities or pockets into which the offending matter may collect.

We have illustrated and described one form of this mechanism, which we now believe to be a preferred form of the device but it is obvious that mechanical changes or adaptations may be made, without departing from the principle of the invention, if it be hereafter desired to do so, and we hereby reserve the right to make such mechanical changes or adaptations as may be comprehended within the scope of the appended claims.

What we claim is:—

1. The combination with a fluid conduit, of a casing incorporated into said conduit, valves in the casing movable into active position to close said conduit and into inactive position to open said conduit, a ring having flared faces operatively connected with the valves, sleeves, one on each side of said ring, said sleeves having sloping faces opposite the ring faces, carriers pivotally mounted on the sleeves and means on the ring adapted to engage said carriers to move said sleeves with the ring as the valves are moved into inactive position.

2. The combination with a fluid conduit, of a casing incorporated into said conduit, valves in the casing movable into active position to close said conduit and into inactive position to open said conduit, a ring having flared faces operatively connected with the valves, sleeves, one on each side of said ring, said sleeves having sloping faces opposite the ring faces, carriers pivotally mounted on the sleeves and means on the ring adapted to engage said carriers to move said sleeves with the ring as the valves are moved into inactive position, said ring and sleeves forming a continuation of said conduit through the casing when the valves are in inactive position.

3. The combination with a fluid conduit, of a casing incorporated into the conduit, valves in the casing movable into active position to close said conduit and into inactive position to open said conduit, means in the casing and operatively connected with said valves and movable in concert with the valves into active position to form a continuation of said conduit through said casing, and into inactive position, said means including annular members having cooperating sloping faces, a carrier mounted on one of said annular members, and an abutment carried by another annular member adapted to engage said carrier to effect the simultaneous movement of said members in one direction.

4. The combination with a fluid conduit, of a casing incorporated into the conduit, valves in the casing movable into active position to close said conduit and into inactive position to open said conduit, means in the casing and operatively connected with said valves and movable in concert with the valves into active position to form a continuation of said conduit through said casing, and into inactive position, said means including annular members having cooperating sloping faces, a carrier mounted on one of said annular members, and an abutment carried by another annular member adapted to engage said carrier to effect the simultaneous movement of said members in one direction, a stop carried by the casing, means carried by one of said annular members adapted to engage said stop, when this latter member is aligned with the conduit, said casing having a recess provided to receive said carrier to effect its release from said abutment and to permit the further movement of the other member.

5. A device of the character described including a casing having openings, valves in the casing movable into active position to close said openings, and into inactive position to open said openings, sleeves in said casing, a wedge like ring between the sleeves and operatively connected with said valves, releasable interlocking means carried by said ring and sleeves through which said ring and sleeves are simultaneously moved into alignment with said openings, when the valves are moved into inactive position.

6. A device of the character described including a casing having openings, valves in the casing movable into active position to close said openings, and into inactive position to open said openings, sleeves in said casing, a wedge like ring between the sleeves and operatively connected with said valves, releasable interlocking means carried by said ring and sleeves through which said ring and sleeves are simultaneously moved into alignment with said openings, when the valves are moved into inactive position and means for stopping the sleeves when they align with said openings.

7. A device of the character described including a casing having openings, valves in the casing movable into active position to close said openings, and into inactive position to open said openings, sleeves in said casing, a ring between the sleeves and operatively connected with said valves, releasable interlocking means carried by said ring and sleeves through which said ring and sleeves are simultaneously moved into alignment with said openings, when the valves are moved into inactive position, means for stopping said movement of the sleeves when they align with said openings, said interlocking means being adapted to be released when the sleeves are stopped to permit the further movement of said ring.

8. A device of the character described including a casing having openings, valves in the casing movable into active position to close said openings, and into inactive position to open said openings, sleeves in said casing, a ring between the sleeves and operatively connected with said valves, releasable interlocking means carried by said ring and sleeves through which said ring and sleeves are simultaneously moved into alignment with said openings, when the valves are moved into inactive position, means for stopping said movement of the sleeves when they align with said openings, said interlocking means being adapted to be released when the sleeves are stopped to permit the further movement of said ring, said ring and sleeves having sloping contacting faces effective to seat the sleeves securely around said openings, by said further movement of said ring.

9. A device of the character described including a casing having openings, valves in the casing movable into active position to close said openings, and into inactive position to open said openings, sleeves in said casing, a ring between the sleeves and operatively connected with said valves, releasable interlocking means carried by said ring and sleeves through which said ring and sleeves are simultaneously moved into alignment with said openings, when the valves are moved into inactive position, means for stopping said movement of the sleeves when they align with said openings, said interlocking means being adapted to be released when the sleeves are stopped to permit the further movement of said ring into alignment with said sleeves, said ring and sleeves then forming a continuous conduit through said casing between said openings.

10. A device of the character described including a casing having openings provided with surrounding inside seats oppositely disposed valves in the casing movable into active position to close said openings and into inactive or open position, a sectional conduit in the casing movable into active position in alignment with said openings and into inactive position out of such alignment, one of the sections of said conduit being connected to the valves and being operative to actuate the conduit into said active position, said sections having co-operating sloping faces effective to seat the opposing ends of the conduit firmly against the seats, when in alignment therewith, interengaging means carried by the casing and conduit, respectively, and effective to stop one end of the conduit in substantial alignment with its opposite seat, releasable means operatively connecting the sections of the conduit, said releasable means being adapted to be automatically disengaged, when said end of said conduit is stopped, to permit the further independent movement of the actuating section, whereby said sloping faces may coact to seat the conduit ends firmly against said seats.

11. A valve including a casing having openings, a controlling assembly in the casing including valves movable into active position to close said openings and into inactive position to open said openings, said assembly also including conduit members one of which is connected with said valves and is provided with a sloping contact face and another of which has a sloping contact face, said faces being arranged to co-act, a carrier pivotally mounted on one of said conduit members and means on the other conduit member adapted to engage said carrier to move the corresponding member, with said other member as the valves are moved into inactive position.

In testimony whereof we have signed our names to this specification.

CHARLES R. LAW.
WILLIAM LAW.
CHARLES T. LAW.